UNITED STATES PATENT OFFICE.

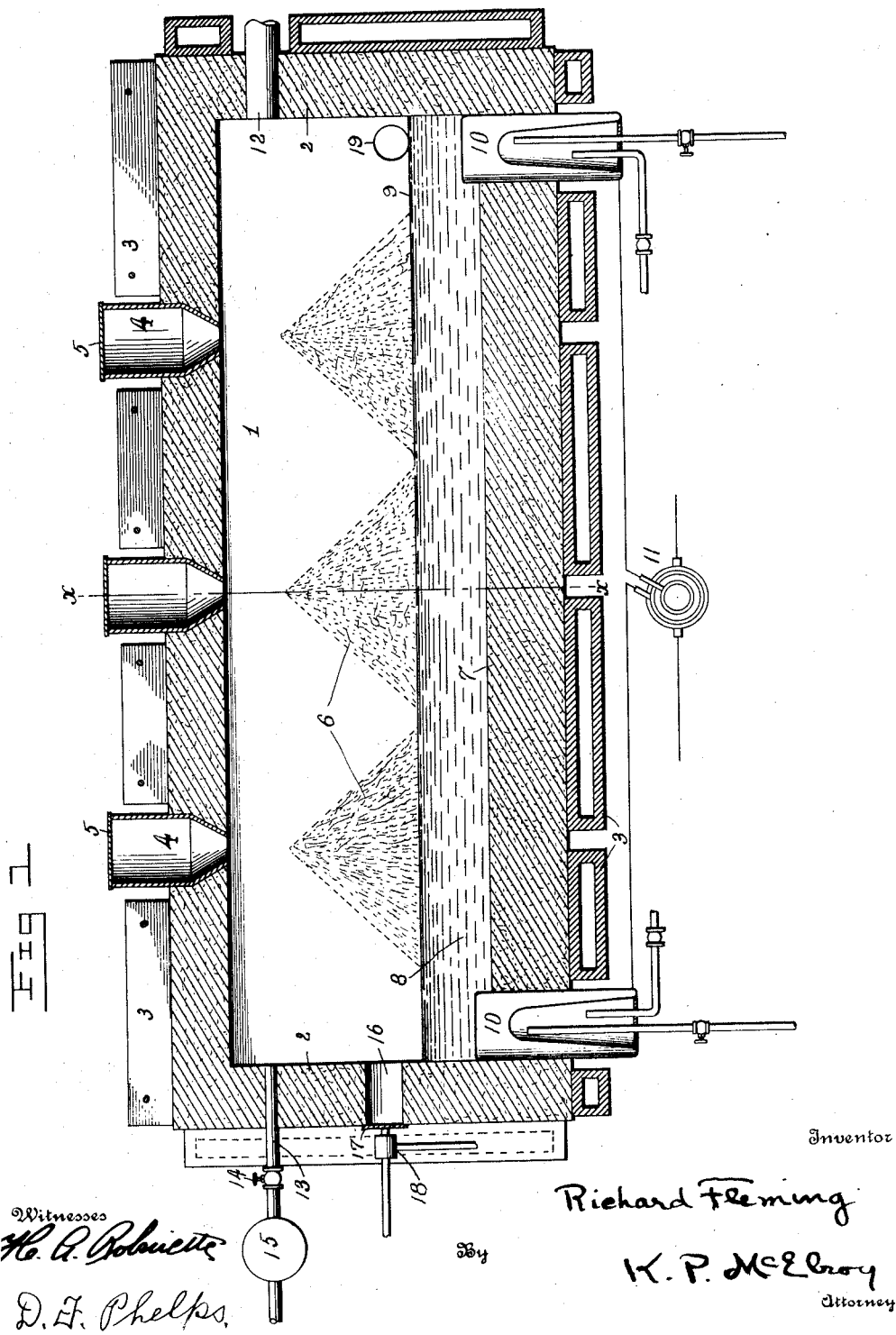

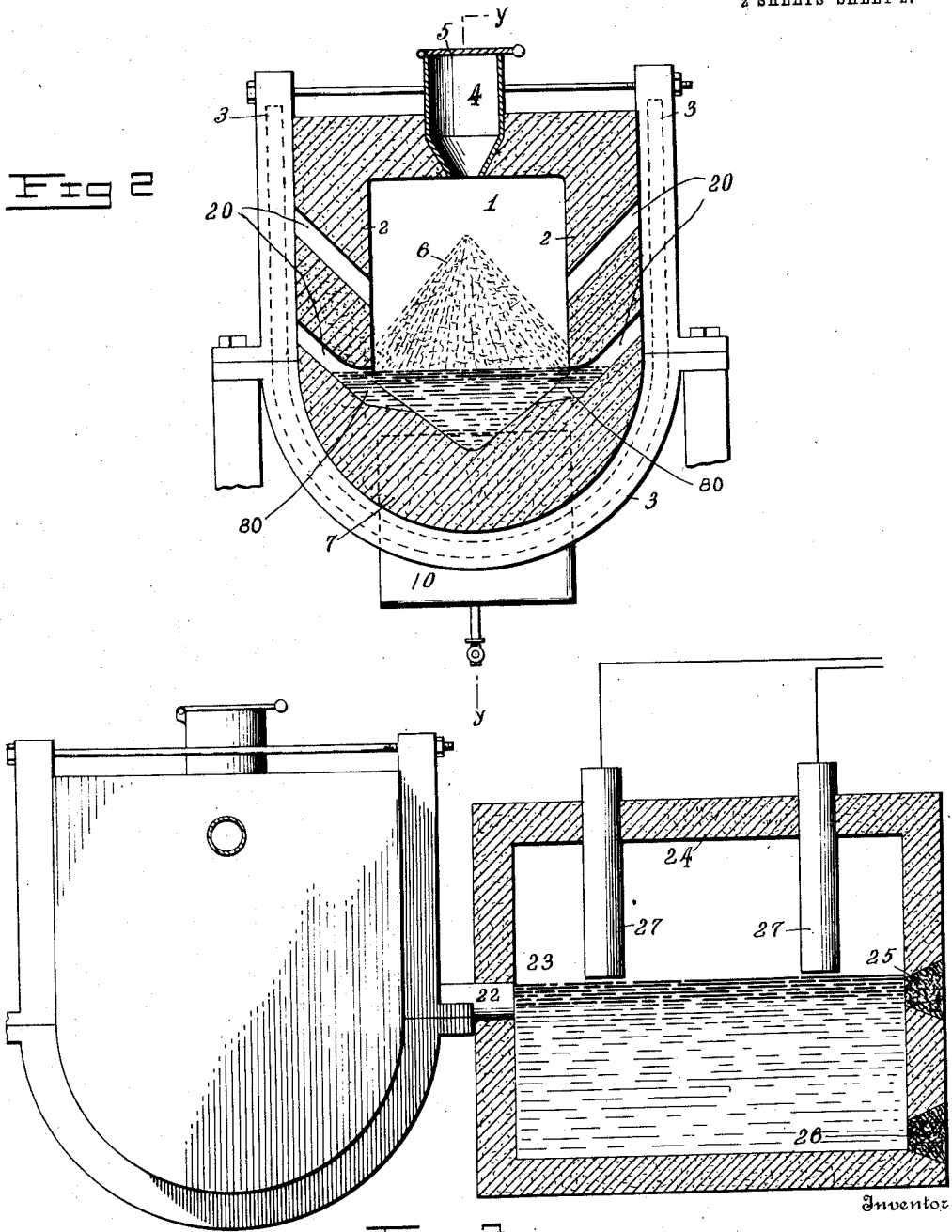

RICHARD FLEMING, OF NEW ROCHELLE, NEW YORK.

SMELTING PROCESS AND APPARATUS THEREFOR.

981,850.  Specification of Letters Patent.  Patented Jan. 17, 1911.

Application filed July 13, 1909. Serial No. 507,354.

*To all whom it may concern:*

Be it known that I, RICHARD FLEMING, a citizen of the United States, residing at 23 Euclid Place, New Rochelle, in the county of Westchester and State of New York, have invented certain new and useful Improvements in Smelting Processes and Apparatus Therefor, of which the following is a specification.

This invention relates to smelting processes and apparatus therefor; and it comprises a method of concentrating ores by liquating valuable metalliferous minerals therefrom with the aid of a layer of matte maintained in a molten condition and electrically heated, the liquated matters being then separated from the valueless constituents of said ores; and it also comprises certain apparatus, or organizations of apparatus elements, useful in performing said process, said apparatus comprising a vertical inclosed chamber adapted to maintain a layer of molten matte and mineral matter upon its hearth and a column of mineralized matter or ore thereabove, means for electrically heating said matte layer, means for removing volatilized and liquefied matters and an electrically heated forehearth for perfecting the gravital separation of such liquefied matters; all as more fully hereinafter set forth and as claimed.

In extracting copper and other valuable metals from their ores one of the methods customarily employed is the conversion of the valuable minerals into matte. Matte is a more or less indefinite mixture of sulfids and other bodies; copper matte being a mixture of cuprous sulfid, or copper subsulfid ($Cu_2S$) with other sulfids, arsenids, antimonids, etc. Ordinary copper sulfid (CuS) upon heating loses half its sulfur and becomes converted into the subsulfid. Pyrites ($FeS_2$), similarly, upon heating loses half its sulfur as such by volatilization and becomes converted into ferrous sulfid (FeS). These two lower sulfids form the main part of the ordinary mattes; copper matte, for example, being ordinarily a mixture of cuprous and ferrous sulfids with indefinite amounts of other sulfids, of antimonids or arsenids, and, perhaps, of various oxids. Little is definitely known as to the form in which gold, silver, nickel, cobalt and other valuable metals occur in the ordinary mattes.

Matte has many valuable characteristics for metallurgical purposes since it readily dissolves most of the valuable metalliferous minerals and native metals, and when produced in ores containing copper, gold, silver, nickel and cobalt it readily dissolves and collects them. In ordinary matte making processes, however, it is rarely allowed to contain more than 40 to 50 per cent. of copper (cuprous sulfid in a pure state contains a little less than 80 per cent. copper) since with higher percentages there is apt to be a loss of copper, the copper oxidizing under the oxidizing conditions usually maintained in matte making and tending to slag off with the silica always present in ores. In the presence of sufficient iron sulfid however copper and the other valuable metals do not so tend to slag away; and for this reason it is customary to cause the matte to contain considerable ferrous sulfid.

In the production of copper matte, many methods are in use. One is simply to smelt the ore in a reverberatory furnace, burning off the excess of sulfids over that necessary to make the desired matte and slagging off the silica, silicates, etc., always present in ore. Often the greater part of the sulfids are first destroyed by roasting the ore in various ways; a process which is disadvantageous since the heat produced in the oxidation of such sulfids cannot well be utilized in the smelting operation proper and since the roasting converts the iron largely into the highly oxidized form of $Fe_2O_3$ which must subsequently be again reduced in the matte making operation. Another method seeks to utilize the heating value of the sulfids by burning the ore with air blasted through a mass thereof in a converter or in a shaft furnace; the latter being the method usually done with raw ores. This burning however can practically only be employed with ores consisting mainly of iron pyrites ($FeS_2$). Pyrites under these conditions first loses one atom of sulfur by volatilization and combustion, becoming converted into FeS, and this latter then oxidizes, the iron oxidizing to FeO which slags off with the silica present and the sulfur burning to $SO_2$ which escapes as a gas. Both these oxidations yield heat as does the oxidation of the liberated atom of sulfur. The conditions in the ordinary shaft furnace are not well suited however to burning this liberated sulfur since it escapes upward from the molten mass around the twyers and condenses in the ore mass above. Nevertheless, in smelting rich pyritous ores in a shaft furnace the heat evolved in burning a modicum of the charge (a portion of the sulfids must be left unburned to produce matte) may be sufficient to fuse and slag off gangue (the ferrous oxid formed acting as a very efficient flux for this purpose) and give a fused mass of matte containing substantially all the gold, silver, copper, nickel and cobalt of the charge. Unfortunately the richer ores are rarely pure sulfids and with many ores the heat evolved in simple oxidation of the sulfids present is insufficient to effect the desired results. Furthermore, there is not always sufficient iron pyrites present to afford the desired amount of heat by its combustion and also to afford sufficient ferrous sulfid to shield the copper, etc., in the matte while the addition of pyrites to the ore under treatment is not always practicable, and, if the pyrites available happens to be a barren type, the addition of this material to the charge involves expense and labor without concomitant results. Poor ores are therefore often first concentrated by the ordinary metallurgical methods, as by wet concentration, to remove the bulk of the gangue and waste mineral matter and leave a mass of comparatively pure and rich sulfids for the matte making treatment, but this not only involves expense and loss, but the fines recovered are not in good physical condition for handling in the ordinary matte smelting devices, such as shaft furnaces, converters and the like, the fine ore dusting away and also impeding the draft. In any ore, a large proportion will be found to exist as fines and these fines, like those resulting from concentration, are difficult to handle, while such fines are frequently the richest portions of the ore. In practice, it is found that in these oxidation methods when employing ordinary ores or concentrates and smelting in a shaft furnace it is usually necessary to add more or less carbonaceous fuel, such as coke, to the charge to furnish more heat units. But fuel is not only usually expensive in the districts where metalliferous minerals are found but its use in conjunction with matte smelting introduces many complications. In smelting sulfids to form matte in the manner described, oxidizing conditions should prevail in the furnace while in the presence of carbonaceous fuel reducing conditions must necessarily occur to a greater or less extent unless an undue excess of air be employed.

In the present invention, I have devised a cheap, simple and ready method of handling ores, and particularly for the production of copper matte, avoiding the noted objections and securing many new advantages while being applicable to many ores which cannot now be easily or cheaply treated. To this end, I first produce a layeriform body or bath of molten sulfids or matte, maintaining it in the molten condition by the supply of external energy. Most conveniently, this energy is supplied by electrical heating, either resistance heating or inductive heating as may be desired. Molten mattes are well adapted for resistance heating as they are conductive for the current. The current employed is preferably alternating to avoid complicating the reactions by electrolysis. In the embodiment of my invention at present preferred no electrolysis is desired. The voltage and amperage employed will of course depend upon the mass of conductor, the length of conductor employed and the temperature desired.

Preferably the bath of matte is given the form of a long shallow narrow pool maintained upon the hearth of a similar and inclosing chamber, such chamber being, if desired, of greater cross-sectional area than the column of ore to be supplied to such pool. With the aid of this inclosing chamber, very exact conditions of temperature and oxidation may be maintained. The heat of the matte does not escape and the conditions as regards heat and as regards oxidation may be maintained as desired. If so desired, no oxidation whatever may occur or any controlled amount of oxidation may be effected. Where oxidation is effected, the electrically developed heat may also be used to complement it.

Sulfids delivered to this molten pool will be melted and, where containing more sulfur than corresponds to the matte-making sulfids, will be freed of the excess of sulfur by volatilization; $FeS_2$, for instance, becoming $FeS$ with liberation of $S$; $CuS$ becoming $Cu_2S$, etc. Where oxidized ores or metals are used together with the sulfid ore or where the ore itself contains oxids, such as $CuO$, carbonates, such as copper carbonate, etc., this excess of sulfur functions usefully in converting such bodies into matte also. With ores containing an excess of sulfur over that needed for matte-making, this excess may also be caused to function usefully in another way hereinafter set forth.

Comparatively cold, solid sulfids delivered into the bath of hot molten matte in the path of the current cause a local rise in resistance and a consequent local development of heat until such sulfids are melted. In the embodiment of this process at present preferred, therefore, after the production of an electrically heated, linear pool of molten matte, the ore to be treated is delivered into it between the electrodes; preferably as one or more heaps or columns having one or more free sides and coming from corresponding hoppers, and having their bases resting in the bath of matte with molten matte on either side in the path of the current. Such a heap may be caused to assume the shape of an angle-of-repose pile with its base in and bathed and impregnated by the molten matte layer, the particles of solid ore forming spots of local high resistance therein, both by the lessening in area of the cross-section of the fluid conductor where they occur and also by the chilling, with a consequent local development of high temperature in such base at these points, quickly melting the solid sulfids of the ore and liquating them out of the gangue to join the body of molten matte. The molten matte is allowed to flow away from the pool as the latter exceeds its predetermined level, thereby maintaining the depth and resistance of the pool approximately constant. And with such an angle of repose pile resting at its base in the pool of molten matte, the unmelted ore at its base is positively held within the molten layer and does not float.

While in the present embodiment of this invention it is preferred to have the ore piles resting in the matte pools of less cross-sectional area than such pool or the chamber itself, as in feeding the ore in piles having an angle-of-repose on one or more sides, yet the ore column may substantially fill the chamber above the matte pool; and particularly where a smelting operation is resorted to in addition to the electrical heating.

The particular state of comminution of the ore employed is not very important in the embodiment of this process at present preferred, fines having no opportunity to impede draft or to dust away while, on the other hand, if the ore be employed in a coarse state, the sudden heating as it contacts with the molten matte tends to crack and shatter it in a way permitting efficient liquation of the contained sulfids. Fine ore and concentrates are however preferred as working more uniformly.

In the process as just described, there being no oxidation necessarily required there need be no excess of sulfids to produce a matte, it being sufficient if enough sulfur be present to form matte with the valuable metals of the ore. Nor is an excess of ferrous sulfid necessary in the matte to shield the copper. Chalcocite, or copper glance, for instance, may be liquated out of ore to form a pure copper matte without the necessity for the addition of other sulfids to shield the cuprous subsulfid of this ore. The same is true of ores containing only such sulfids as chalcopyrite ($CuFeS_2$), bornite ($Cu_3FeS_3$), etc. Ores of this character cannot of course be used without other sulfids in ordinary pyritic smelting or in other ordinary matte making processes.

Oxidized ores may be used in conjunction with sulfureted ores, it being necessary to use only enough of the latter to furnish the sulfur requisite for matte; to give enough sulfur to convert the oxidized valuables into sulfids. The values can thus be recovered from any ore or composition containing copper, gold, silver, nickel or cobalt; such as the carbonates, oxids, native metals, such as Lake Superior or Arizona copper, gold in quartz, scrap copper, mattes, concentrates, etc.

The described process is however also applicable to richer sulfid ores and concentrates, such as pyrites or mixtures containing pyrites, and in such application many economies and advantages may be obtained by the use of certain expedients. For instance, the sulfur vapors freed in heating the molten matte may be led into suitable collecting chambers and condensed as flowers of sulfur as in my copending application No. 439,521 (Patent 945,926, Jan. 11, 1910).
Draft means may be employed to facilitate the recovery of such vapors as may also sweeping currents of neutral gases, like products of combustion, steam, etc. For this recovery, it is better that the ore be contained in a comparatively large chamber, leaving a free space about the pile for the reception of the vapors since sulfur vapors accumulating within the ore pile are not readily withdrawn without the use of an undue amount of draft. The use of the described angle-of-repose piles for this purpose is convenient. A free surface of the matte pool is also desirable. Another method of securing utility from these evolved sulfur vapors is to introduce air in limited amounts into the chamber above the matte bath, causing the evolved sulfur to burn in or about the ore piles, yielding heat thereto and economizing in the amount of heat to be developed in the bath proper. When so burned, not only is the heat utilized but rich bodies of gases are formed which may be employed for making sulfuric acid, sulfur trioxid, etc. When air is used for burning free sulfur, the sulfur dioxid formed is diluted only by the nitrogen accompanying the oxygen uniting with the sulfur while when burning pyrites the gas mixture produced is diluted also by the nitrogen accompanying the oxygen fixed by the iron as iron oxid. The sulfurous vapors formed in the ordinary matte-making processes are of this latter character and are not nearly so advantageous for acid making. With such ores rich in sulfur, development of heat can also, if desired, be caused to occur in the bath of matte itself, a certain amount of air being blown through the pool and giving heat to reinforce that electrically developed. This is particularly useful in treating ores containing much silica or silicates since oxidation in the matte bath forms oxid of iron which is an efficient fluxing agent.

With such ores rich in sulfur, by a modification of the present invention an improved type of "pyritic smelting" may be produced, a shaft chamber, preferably long, narrow and comparatively high adapted to contain a descending column of ore being provided with the described type of hearth adapted to form and maintain a shallow linear pool of electrically heated molten matte and being also provided with twyers for introducing air into such pool. In the ordinary type of pyritic smelting, it is usually necessary in practice to supplement the heat developed by the oxidation of the sulfids by heat developed by the oxidation of carbon; or, in other words, to feed more or less cabonaceous fuel with the ore charge. This carbon, as stated, complicates the conditions within the furnace, not only by using up a portion of the air but by developing carbon monoxid, a strongly reducing gas; and it has other disadvantages as well. Particles of coke, for instance, are apt to become saturated with fluid matte so that they will no longer burn and are simply a solid impurity in the matte bath. But by supplementing the heat of the burning sulfids by electrically developed heat in the molten matte itself, this addition of carbon and complication of conditions is no longer necessary. With many ores the amount of heat which need be furnished by the current is minimal, the oxidation by the draft itself furnishing nearly all the required heat units. With a controllable supply of electrically generated heat, the reactions within the smelting chamber becomes also controllable and the whole smelting operation is rendered positive and controllable. In the stated modification therefore, a shaft furnace is supplied with a descending column of ore or ore mixtures in the usual way, the basal pool of molten matte and slag being maintained in a molten condition and tapped off in the usual way while a blast of air, heated or unheated, is supplied at the base of the column, being blown through the matte pool or immediately thereabove as may be desired. A suitable amount of heat to supplement that developed by the oxidation and to even out temporary irregularities therein is supplied to the matte by electrical energy in the manner described. While if desired for any reason a limited amount of carbonaceous fuel, such as wood, coal or coke, may be supplied to and admixed with the ore charge, this is not ordinarily desirable or necessary, the heat of oxidation of the sulfids and the electrically developed heat in reciprocally proportioned amounts being relied upon to establish the necessary thermal and other conditions within the shaft chamber.

The use of an inclosing chamber makes it practicable to employ direct heating of the ore pile resting at its base in the molten matte as by the use of flames of burning oil, gas, etc., which are made to play on the heap or heaps of ore where these are spaced away at one or more points from the wall of the containing chamber to aid in preheating; or upon the matte bath itself. In doing the latter, the floating slag serves to protect the underlying matte from the direct action of the flame and preclude undesirable reactions. The ore may of course be preheated before introduction into the apparatus, as may air blasts when used.

The gangue occurring with or in the ore may be slagged or not, as may be desired, or as circumstances may dictate. Ordinarily it is better to slag it, at least in part, though the slag produced may contain comparatively large grains of silica or silicates without loss, in many instances. Many ores are so constituted that a simple liquation yields all the values under the circumstances described. If the ore be not self-fluxing, fluxing ores or substances may of course be added, or oxids of iron, etc., may be produced therein as described. In burning the sulfur in or around ore heaps in the manner described, a limited oxidation of the ore itself may be permitted; or oxids may be formed by blasting the matte with limited amounts of air. As will be obvious, the described method permits a wide range of variations in treating various ores and in slagging the gangue. Since the electrically developed heat in the matte bath is independent of the composition of the ore or charge, the temperature may be as high as may be desired and any type of slag may be used, whether low melting or not.

With many ores, and particularly where comparatively viscous or infusible slags are produced, I find it desirable to supplement the treatment in the chamber described by the use of an electrically heated forehearth. With a shallow, comparatively small bath of molten mattes, the opportunities for gravital separation may not be as good as desired. I therefore customarily draw off the overflowing slag and matte into such a forehearth this being of comparatively large dimensions to give a good opportunity for settling. An efficient way of producing heat in this forehearth at the point where it is desired is to approximate a pair of electrodes connected to a source of alternating current to the floating layer of slag. The resulting arcs and the resistance of the slag will raise it to any temperature desired and cause it to be fluid enough to quickly drop included prills of matte. It is desirable that the electrodes should not reach to the underlying matte layer.

In the accompanying illustration I have shown, more or less diagrammatically, certain organizations of apparatus elements within the scope of this invention.

In this showing, Figure 1 is a vertical longitudinal section of a smelting apparatus, the view being taken along line y—y of Fig. 2; Fig. 2 is a vertical transverse section of the same apparatus, the view being taken along line x—x of Fig. 1; and Fig. 3 is a vertical transverse section along line z—z, of Fig. 1, showing the forehearth.

Referring first more particularly to Fig. 1, a long shaft chamber 1, having walls 2 of refractory material suitably supported by spaced metal reinforcing elements 3 shown as water cooled (said reinforcements being so arranged as not to form a continuous electrical conductor and give rise to short circuiting) is provided with a series of hoppers 4, closed by gates 5, and so positioned as to afford a similar series of piles of ore 6, resting on the hearth 7 in an angle-of-repose position, their bases being bathed by the pool of matte 8 and superincumbent slag layer 9. Passing trough the chamber walls or (as shown) through the hearth at each end is an electrode 10, the two electrodes being connected to a source of suitable alternating current 11. These electrodes may be made of ingot copper or steel castings and are preferably, as shown, water-cooled. Passing through one end of the chamber is an outlet conduit 12 which may be connected to a sulfur chamber (not shown) or to any other device for utilizing fumes of sulfur or sulfur dioxid. Through the opposite wall passes an air conduit 13, gated at 14, and connected to any suitable source of air or other gases, as fan 15. Below this air conduit is another aperture 16 through the chamber wall, closable as by door 17, through which, if desired, a current of flame may be sent by firing device 18, shown as an oil burner. Outlet 19 serves to remove matte and slag and to keep the liquid level on the hearth constant or approximately so. Twyers 20 (see Fig. 2) are so arranged as to render it possible to blow air through the pool of matte upon the hearth while the upper pair of twyers 21 at a higher level allow introducing air or flame on the surface of the liquid pool.

Referring more particularly to Fig. 3, the matte outlet 19 of the chamber is shown as communicating by conduit 22 with forehearth 23. This forehearth is shown as a chamber large enough to contain an accumulation of matte and slag and suitably roofed at 24. Slag outlet 25 and matte outlet 26 at different levels respectively permit removal of slag and matte from time to time or continuously. Through the roof of the forehearth pass a pair of electrodes 27, connected to any suitable source of current, which is preferably alternating and in arc-producing relationship to the slag layer.

In the use of the described process with the described apparatus, the hearth is first supplied with molten matte from any suitable source and a suitable current is passed through the layer, which forms a resister, to maintain it at any desired temperature. Supposing a poor ore, containing merely enough sulfur to matte the valuables, is to be treated, this ore, mixed if necessary with sufficient flux or fluxing ore to slag the gangue or the major part of it (and the slag produced need not necessarily be of a type which is particularly fluid under ordinary conditions since the electrical heating in the furnace and in the forehearth will give any temperature desired) is passed into the chamber from the hoppers, forming angle-of-repose piles on the hearth, resting in the pool of matte. Wherever these piles occur, the resistance of the conductor is raised and more heat is developed; or, in other words, heat is developed where the ore is wetted by the matte. This heat melts and liquates out any sulfids present and converts them into matte. With ore and matte protected and shielded by the inclosing chamber there need be no more sulfur in the ore than is necessary to form the matte, it not being necessary to rely upon the combustion of sulfids for the heat. With ores richer in sulfur, any excess of sulfur present beyond that necessary to form FeS with the iron and $Cu_2S$ with the copper, will distil up into the chamber whence it may pass away through outlet 12. Arsenic, antimony and other metals volatile under the particular conditions employed may also pass forward with the sulfur vapors. The whole chamber being hot, the sulfur does not condense on the walls and that condensing in the sinking pile of ore is again evaporated. The operation being performed in a closed chamber an accurate control of thermal and other conditions is possible. Under the high heat of the matte bath, the particles of ore crack and shatter, allowing the molten sulfids to liquate out and join the matte while the slagged gangue rests on the matte. It is not very important here when using the described type of forehearth, whether the separation of matte from the slag be very good or not. Slag and matte pass together into the forehearth and separate gravitally. The slag being heated and liquefied by current from poles 27, it drops any inclosed prills of matte.

If the ore be rich in sulfids, as where it contains considerable pyrites, the distilling sulfur coming from the matte bath may be burned in or around the piles of ore by air from 13, yielding up its heat to warm the ore and furnishing rich fumes of sulfur dioxid at outlet 12. Further heat may also be furnished in the bath itself by twyers 20 supplying air to burn a portion of the iron sulfid to form ferrous oxid, which will aid in slagging any silicious gangue, and to add heat to the bath of matte.

As stated, the heat developed by oxidation may be the main part of that developed within the chamber, the electrically developed heat being used merely as a supplementary and compensating means.

With ores rich in pyrites when oxidizing the matte on the hearth it is often advisable to use an admixture of a silicious ore, either a copper ore or an ore bearing another valuable metal, such as gold-bearing quartz.

With poor ores, containing but little sulfid, for the sake of economy of heat in producing the desired temperatures, a jet of flame may be introduced through 16, playing on the piles, or flame may be introduced through 21 and directed on the surface of the slag covering the matte layer.

The matte passing from the forehearth may be treated in any of the usual ways, as by blasting in a Manhes converter, treatment in a reverberatory, etc., to recover copper and other values therefrom.

The hearth may be, as shown, somewhat V-shaped in section. The electrodes are preferably rather massive and are water cooled. The series of casings inclosing and supporting the refractory walls of the furnace, should be, as shown, spaced away from each other somewhat to prevent short-circuiting between the ends of the furnace, and for the same reason they should be provided with individual means for water cooling. If they are connected to a common water-supply or waste outlet by all-metal piping, short circuiting can, of course, occur, and for this reason rubber or other non-conductive tubing should be provided as part of the supply and waste means for each of the individual jackets.

What I claim is:—

1. The process of smelting ores which comprises forming and maintaining a comparatively long and narrow layer of molten matte in an inclosed chamber under controlled conditions of heat and oxidation while feeding ore comprising sulfur and copper to such molten layer and removing matte and slag therefrom and during such maintenance transmitting a heating current longitudinally through said molten layer.

2. The process of smelting ores which comprises forming and maintaining a comparatively long and narrow layer of molten matte in an inclosed chamber under controlled conditons of heat and oxidation, during such maintenance transmitting a heating current longitudinally through said layer and feeding ore comprising sulfur and copper to such molten layer, said ore being fed as a body lying in the path of such current.

3. The process of smelting ores which comprises forming and maintaining a comparatively long and narrow layer of molten matte in an inclosed chamber under controlled conditions of heat and oxidation, maintaining such layer in a molten condition with the aid of heating current transmitted longitudinally therethrough and feeding ore comprising sulfur and copper to such molten layer, said ore being fed as a body lying in the path of such current and said body extending upward above the level of such layer.

4. The process of smelting ores which comprises forming a layer of molten matte in a suitable inclosed chamber under the controlled conditions of heat and oxidation, maintaining such layer in a molten condition with the aid of heating current longitudinally transmitted therethrough and feeding ore comprising sulfur and copper to such molten layer, said ore being fed as a body lying in the path of such current and said body extending upward above the level of such layer and having a side out of contact with the chamber wall.

5. The process of smelting ores which comprises forming a layer of molten matte in a suitable chamber, maintaining such layer in a molten condition with the aid of heating current longitudinally transmitted therethrough and feeding ore comprising sulfur and copper to such molten layer, said ore being fed as a body lying in the path of such current and said body extending upward above the level of such layer, and having a side out of contact with the chamber wall, sulfur volatilized from such layer being burned about the extended portion to heat the same.

6. The process of smelting ores which comprises maintaining a comparatively long and narrow layer of electrically heated molten matte in an inclosed chamber under controlled conditions of heat and oxidation, while continuously feeding heated ores comprising sulfur thereto and removing molten matte and slag therefrom.

7. The process of smelting ores which comprises maintaining a comparatively long and narrow layer of electrically heated molten matte in an inclosed chamber under controlled conditions of heat and oxidation while continuously feeding heated ores comprising sulfur and copper thereto and removing molten matte and slag therefrom, said layer having other heat supplied thereto.

8. The process of smelting ores which comprises maintaining a comparatively long and narrow layer of electrically heated molten matte in an inclosed chamber under controlled conditions of heat and oxidation while continuously feeding ores comprising sulfur thereto and removing molten matte and slag therefrom, a portion of air being introduced into said layer to aid in heating and to furnish slag-forming oxids and said layer having heat electrically supplied thereto.

9. The process of smelting ores which comprises producing and maintaining a layer of molten matte having heat electrically supplied thereto, feeding ore into such layer in angle-of-repose piles extending thereabove and having a free side, burning volatilized sulfur about the upper extension of the ore piles and introducing a modicum of air into such layer to aid in heating and to furnish slag-forming oxids, drawing off molten matte and slag into a forehearth for gravital separation and during such separation electrically supplying heat to the slag layer.

10. A smelting apparatus comprising a closed chamber having a long and narrow shallow hearth and provided with an overflow outlet spaced thereabove sufficiently far to allow the formation of a shallow pool of molten matte, means for passing alternating current through the molten pool on such hearth, means for feeding sulfid ore to the molten material upon such hearth and means for utilizing sulfur volatilized from such molten material.

11. A smelting apparatus comprising an inclosed chamber having a comparatively long and narrow shallow hearth, one of the chamber walls being provided with an overflow outlet spaced above the hearth sufficiently far to allow the formation of a shallow pool of molten matte, means for passing alternating current through the molten pool on the hearth, and means for feeding sulfid ore upon such hearth in angle-of-repose piles.

12. A smelting apparatus comprising a closed chamber having a long and narrow shallow hearth, one of the chamber walls being provided with an overflow outlet spaced above the hearth, means for passing alternating current through molten material on the hearth, means for feeding sulfid ore upon such hearth in angle-of-repose piles, and means for burning volatilized sulfur around such piles.

13. A smelting apparatus comprising a chamber having a shallow hearth and having certain walls spaced apart farther than the width of said hearth, between other walls, one of said walls being provided with an overflow outlet spaced above the hearth, means for passing alternating current through molten material on the hearth, means for feeding sulfid ore upon such hearth in angle-of-repose piles, means for burning volatilized sulfur around such piles and means for introducing a modicum of air into the molten material upon said hearth.

14. In combination, means for producing a constantly replenished comparatively long and narrow electrically heated molten layer of matte and slag in an inclosed chamber and means for withdrawing produced matte and slag for gravital separation, the last named means comprising means for electrically heating the layer of separated slag.

15. A matte producing apparatus comprising a smelting furnace provided with an inclosed chamber having a comparatively long and narrow and shallow hearth and having an overflow outlet spaced thereabove, means for passing an alternating current through molten material on said hearth, means for feeding sulfid ores to said molten material, a forehearth withdrawing molten matte and slag through said outlet and means for electrically heating the layer of slag in said forehearth.

16. In combination, a vertical chamber having walls of refractory materials and having a hearth, electrodes at each end of said hearth passing through said walls and a plurality of exterior reinforcing metal casings supporting said walls intermediate said electrodes, such casings being spaced away from each other and each such casing being provided with individual means for water cooling the same.

17. In combination, a vertical chamber having walls of refractory materials and having a hearth, electrodes at each end of said hearth, each such electrode being provided with means for water cooling the same, and a plurality of exterior reinforcing metal casings supporting said walls intermediate such electrodes, such casings being spaced away from each other and each such casing being provided with individual means for water-cooling the same.

18. The process of smelting sulfid ores which comprises producing and maintaining an electrically heated comparatively long and narrow layer of fused sulfids in an inclosed chamber, producing and maintaining a pile of ore with its base resting in such layer in the path of the current and having a free side within such chamber and heating such side by combustion heat.

19. The process of smelting sulfid ores which comprises producing and maintaining an electrically heated comparatively long and narrow layer of fused sulfids in an inclosed chamber, producing and maintaining a pile of ore with its base resting in such layer in the path of the current and having a free side within such chamber and heating such side by combustion of extricated sulfur.

20. The process of smelting sulfid ores which comprises producing and maintaining an electrically heated comparatively long and narrow layer of fused sulfids in an inclosed chamber, producing and maintaining a pile of ore with its base resting in such layer in the path of the current and having a free side within such chamber, producing oxidation within such layer by air blown therethrough and heating such side by combustion heat.

21. The process of making copper matte which comprises producing and maintaining an electrically heated comparatively long and narrow layer of copper matte in an inclosed chamber, producing and maintaining a comparatively tall column or pile of ore comprising sulfur and copper within such chamber with its base resting in such layer in the path of the current, such pile having a free side, heating such side by combustion heat and producing oxidation within such layer by blowing air therethrough.

In testimony whereof, I affix my signature in the presence of witnesses.

RICHARD FLEMING.

Witnesses:
  K. P. McElroy,
  H. O. Chute.